United States Patent [19]
Weigand et al.

[11] Patent Number: 5,285,324
[45] Date of Patent: Feb. 8, 1994

[54] MAGNETIC HEAD-TO-RECORDING MEDIUM SUPPORT APPARATUS

[75] Inventors: John G. Weigand, Churchvill; Francis C. Long; Robert J. Blackman, both of Rochester, all of N.Y.

[73] Assignee: Eastman Kodak Company, Rochester, N.Y.

[21] Appl. No.: 701,727

[22] Filed: May 17, 1991

[51] Int. Cl.$^5$ .............................. G03B 31/00
[52] U.S. Cl. ........................... 360/3; 360/2; 360/63; 360/104
[58] Field of Search ............... 360/3, 104, 63, 2

[56] References Cited

U.S. PATENT DOCUMENTS

| | | | |
|---|---|---|---|
| 3,984,049 | 10/1976 | Shawen | 235/61.11 |
| 4,087,845 | 5/1978 | Saito | 360/130 |
| 4,173,877 | 11/1979 | Kreiskorte | 72/105 |
| 4,408,240 | 10/1983 | Pastore | 360/104 |
| 4,780,782 | 10/1988 | Bordignon | 360/130.31 |
| 5,021,907 | 6/1991 | Zak | 360/104 |
| 5,034,836 | 7/1991 | De Marti, Jr. et al. | 360/3 |
| 5,041,933 | 8/1991 | De Marti, Jr. et al. | 360/3 |

Primary Examiner—Robert J. Pascal
Assistant Examiner—R. A. Ratliff
Attorney, Agent, or Firm—David A. Howley

[57] ABSTRACT

A magnetic reading and/or recording apparatus includes a plurality of magnetic reading and/or recording elements to read and/or record information from/on a flexible magnetic recording material and a flexible plate having several cut-outs arranged to define individual flexible sections of said plate between respective pairs of said cut-outs. The magnetic reading and/or recording elements and the flexible plate are arranged to position the flexible sections of the plate to support respective flexible sections of the flexible magnetic recording material substantially in contact with the magnetic reading and/or recording elements.

6 Claims, 4 Drawing Sheets

MAGNETIC HEAD-TO-RECORDING MEDIUM SUPPORT APPARATUS

CROSS-REFERENCE TO RELATED APPLICATIONS

Reference is made to commonly assigned copending applications Ser. No. 391,746 now U.S. Pat. No. 5,034,836, entitled MAGNETIC HEAD SUSPENSION APPARATUS, and filed Aug. 9, 1989 in the name of Jack C. DeMarti, Jr. and John G. Weigand, and Ser. No. 391,205, now U.S. Pat. No. 5,041,933, entitled MAGNETIC HEAD SUSPENSION APPARATUS, and filed Aug. 9, 1989 in the name of Jack C. DeMarti, Jr. and John G. Weigand.

TECHNICAL FIELD

The invention relates generally to the field of magnetic reading and/or recording apparatus; and in particular to head-to-recording medium support apparatus.

BACKGROUND ART

Conventional magnetic reading and/or recording apparatus is designed to include at least one pair of rollers in the form of a pressure roller and a capstan drive roller, wherein the pressure roller typically is spring-biased towards the capstan roller to drivingly hold a magnetic recording web between the two rollers. Often, respective pairs of rollers are located upstream and downstream of a magnetic reading and/or recording element to transport the magnetic recording web over the magnetic element. The magnetic recording web is held substantially in contact with the magnetic reading and/or recording element by web tension adjacent the magnetic element caused by the location and operation of the two pairs of pressure rollers and capstan drive rollers.

Alternative means for biasing a magnetic recording web substantially into contact with a magnetic reading and/or recording element includes resilient pressure pads and/or leaf springs. Representative of the prior art in this instance are U.S. Pat. No. 3,984,049 issued Oct. 5, 1976 to Shawen and U.S. Pat. No. 4,780,782 issued Oct. 25, 1988 to Bordignon. U.S. Pat. No. 3,984,049 discloses resilient pads which are positioned to be formed in a curved manner by a leaf spring. The leaf spring applies pressure to a magnetic recording web such that the web contacts a-magnetic read element and a magnetic record element. The magnetic read and record elements are located along the length of the magnetic recording web. U.S. Pat. No. 4,780,782 discloses a leaf spring which engages a magnetic recording web and presses the web towards a magnetic reading or recording element when the magnetic element is moved into position to read or record.

The means for biasing a magnetic recording web towards a magnetic read and/or write head disclosed in the above noted U.S. Patents do not lend themselves readily to magnetic recording materials having a plurality of information tracks on the magnetic recording material. Unique problems arise when magnetic recording materials have a plurality of tracks, such as a need to match individual tracks on the recording material with one of a plurality of magnetic reading and/or recording elements.

DISCLOSURE OF INVENTION

According to the invention, there is provided a magnetic reading and/or recording apparatus which includes a plurality of magnetic reading and/or recording elements to read and/or record information from/on a flexible magnetic recording material and a flexible plate having several cut-outs arranged to define individual flexible sections of said plate between respective pairs of said cut-outs. The magnetic reading and/or recording apparatus also includes means for arranging the magnetic reading and/or recording elements and the flexible plate to position said flexible sections of the plate to support respective flexible sections of the flexible magnetic recording material substantially in contact with the magnetic reading and/or recording elements. Thus, the individual flexible sections of the flexible plate in the present invention will generally be aligned with the individual tracks on a flexible magnetic recording material with one of a plurality of magnetic reading and/or recording elements.

BRIEF DESCRIPTION OF DRAWINGS

Other advantages of the invention will become apparent from the following description taken in connection with the accompanying drawings wherein.

MODES OF CARRYING OUT THE INVENTION

Figure 1:
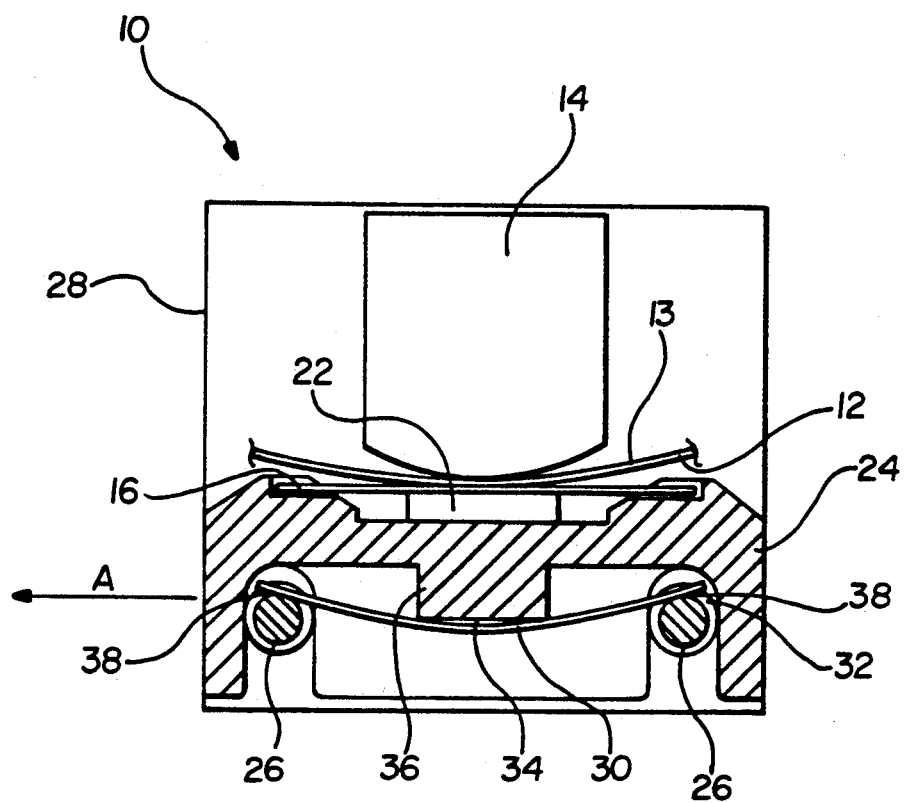
FIG. 1 is a side view in partial cross section of a magnetic reading and/or recording apparatus in accordance with the present invention.
Figure 2:
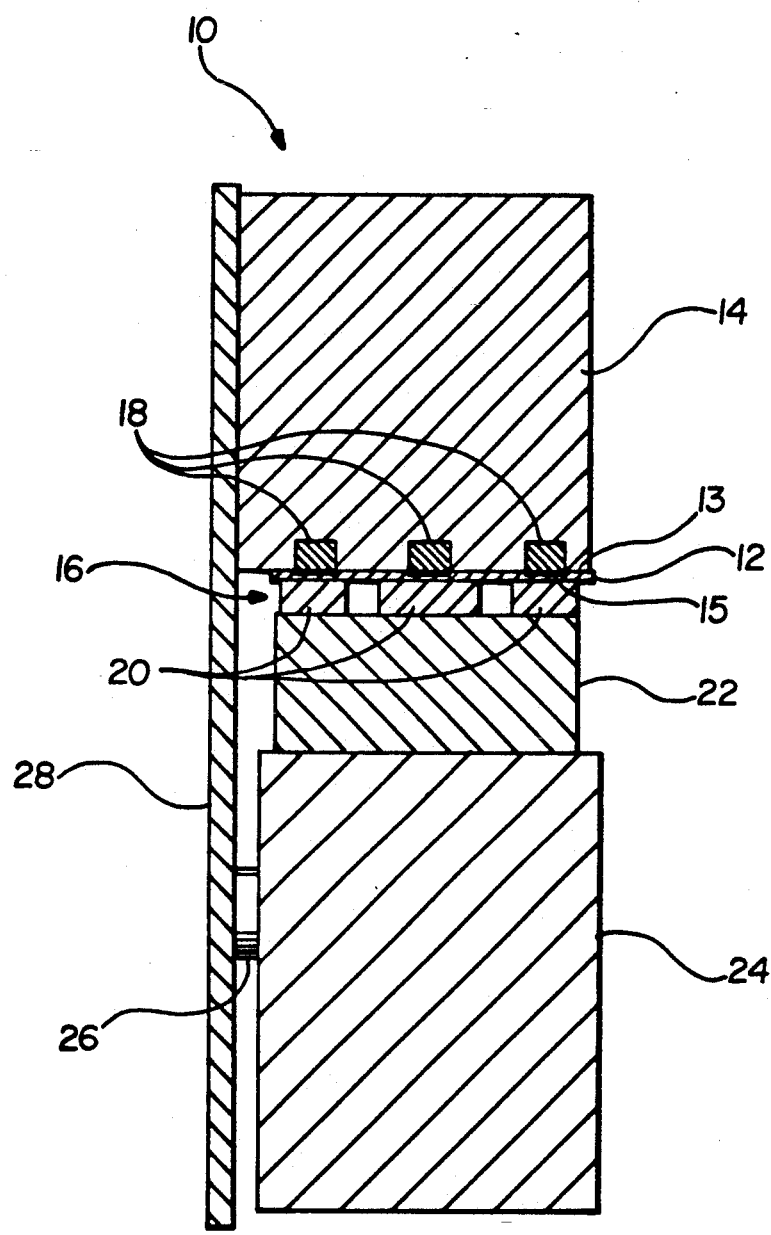
FIG. 2 is an end view of the magnetic reading and/or recording apparatus.

Referring to FIGS. 1 and 2 a preferred embodiment of a magnetic reading and recording apparatus 10 for use in photographic equipment will be described. A flexible photographic material 12, film or paper, is transported by any conventional means well known to those skilled in the art between a housing 14 and a flexible plate 16. The housing 14 has a plurality of openings for accepting a plurality of magnetic reading and/or recording elements 18. The flexible plate 16 is generally aligned with the magnetic reading and/or recording elements 18. The photographic material 12 has a magnetic surface 13 and the capability to have information recorded in distinct tracks 15.

Referring now to FIG. 2 the flexible plate 16 will be described in more detail. The flexible plate 16 has several cutouts defining individual flexible sections 20. Each individual section 20 is generally aligned with a magnetic reading and/or recording element 18. The flexible plate 16 can be made from any thin resilient material such as metal or plastic. The flexible sections 20 can be independently sized to control their respective spring forces. Thus, the individual sections can independently bias the photographic material 12 towards respective magnetic reading and/or recording elements 18. This feature is particularly useful in photographic equipment transporting photographic film.

The photographic material 12 is relatively thick and has a low flexibility. Also, when the photographic material 12 in a web form is wound on a core or reel, the photographic material 12 undergoes a plastic deformation and retains a curvature or core set (curl) after it is released from the core or reel. As relative humidity decreases, the amount of curl increases. Because of the relatively low flexibility of the photographic material, it is difficult to obtain a flat plane at the photographic material to magnetic reading and/or recording element interface if material curl is present. The amount of curl can vary across the width of the photographic material. The individual flexible sections 20 having independent spring forces of the flexible plate 16 can compensate for the varying amounts of curl along the width of the photographic material 12, thus achieving an acceptable interface between the magnetic surface of the photographic material 12 and the individual magnetic reading and/or recording elements 18.

Referring again to FIGS. 1 and 2 the magnetic reading and/or recording apparatus further includes a resilient pad 22 made from a foam or rubber material. The resilient pad 22 supports the flexible plate 16. Both the flexible plate 16 and the resilient pad 22 are supported by recesses in a mounting block 24.

The mounting block 24 rests on shafts 26 which are attached to a support plate 28. The housing 14 is also attached by any conventional means to the support plate 28.

The mounting block 24 is biased towards the housing 14 by a loading spring 30. The loading spring 30 can be a simple leaf spring. The loading spring 30 is mounted in recesses 32 on the shafts 26 and is situated over a lower edge 34 of a round boss 36 located in a central area of the mounting block 24. The lower edge 34 of the round boss 36 is below the upper surfaces 38 of the shafts 26 causing the loading spring 30 to deform, thus creating a spring force to bias the mounting block 24 towards the housing 14. Furthermore, the loading spring 30 contacts the edges of the round boss 36 which enables the mounting block 24 to automatically position the flexible plate 16 along a roll axis which is designated as arrow A in FIG. 1. The automatic positioning of the mounting block 24 insures a uniform interface between the magnetic surface on the photographic material 12 and the magnetic reading and/or recording elements 18.

The support plate 28 can be attached to a magnetic head suspension apparatus as disclosed in allowed U.S. Ser. No. 391,746 filed Aug. 9, 1989 by DeMarti et al. or a magnetic head suspension apparatus as disclosed in allowed U.S. Ser. No. 391,205 filed Aug. 9, 1989 by DeMarti et al. the disclosures of which are hereby incorporated by reference.

In operation, the loading spring 30 causes the mounting block 24 to urge the flexible plate 16 towards the magnetic reading and/or recording elements 18. The ambient resiliency of the flexible plate 16 causes the individual sections 20 to urge the aligned information tracks 15 into substantial contact with the respective magnetic reading and/or recording elements 18. The individual sections 20 independently bias their respective information tracks towards their respective magnetic reading and/or recording elements 18 and can be independently sized in the width dimension to provide desired biasing forces to compensate for irregularities in the photographic material.

This embodiment can include a second magnetic reading and/or recording apparatus 10 mounted in spaced relationship to the other magnetic reading and/or recording apparatus 10 along an opposite edge of the photographic material.

Figure 3:
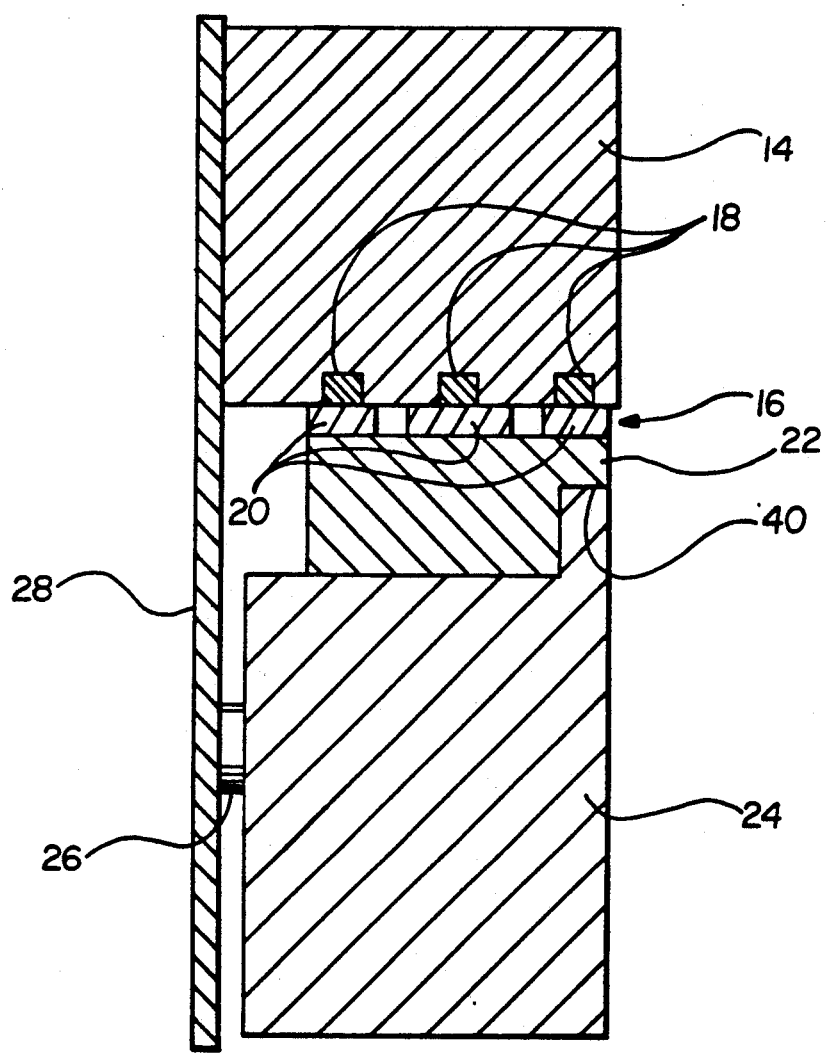
FIG. 3 is a end view taken in cross-section of another embodiment of the magnetic reading and/or recording apparatus.

As mentioned above, photographic material can have a tendency to curl across the width of the material. The curl of the photographic material tends to increase towards the outer edges of the material, thus a relatively larger force may be needed to achieve an acceptable interface between the magnetic surface 13 of the photographic material 12 and its corresponding magnetic reading and/or recording element 18. An alternative embodiment of the magnetic reading and/or recording apparatus 10 in accordance with the present invention is shown in FIG. 3. This embodiment will compensate for the increased curl at the outer edge of the material. The mounting block 24 in this embodiment includes a step 40 located on an outer edge of the mounting block 24. The step 40 compresses an outer edge of the resilient pad 22 which will add to the spring force present in the individual section 20 at the outer edge of the flexible plate 16. The additional force aides in compensating for the curl at the outer edge of the photographic material. Thus, a more uniform interface is achieved between the magnetic surface of the photographic material and the magnetic reading and/or recording element.

Alternative means for varying the force between the magnetic reading and/or recording elements and the photographic material include a resilient pad having a plurality cut-outs, a plurality of resilient pads each having different material densities and changing the position of the loading spring.

Figure 4:
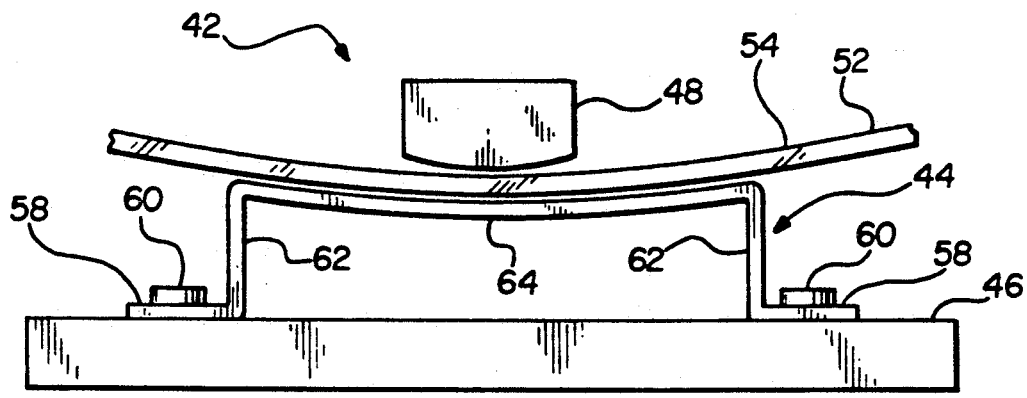
FIG. 4 is a side view of another embodiment of the magnetic reading and/or recording apparatus.
Figure 5:
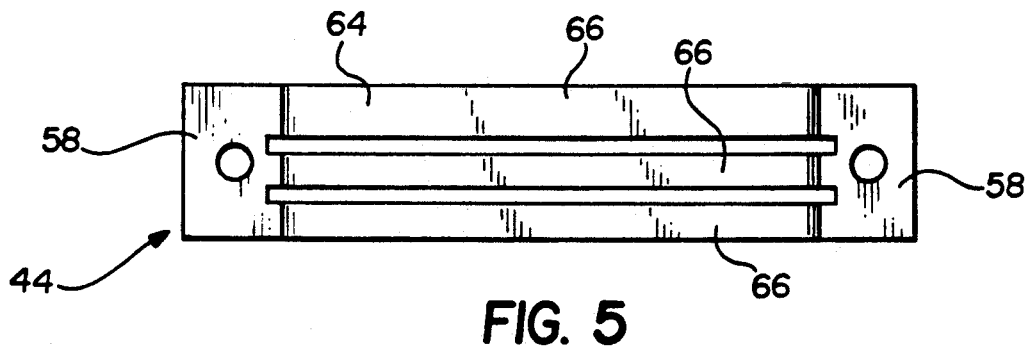
FIG. 5 is a top view of a flexible plate shown in FIG. 4.
Figure 6:
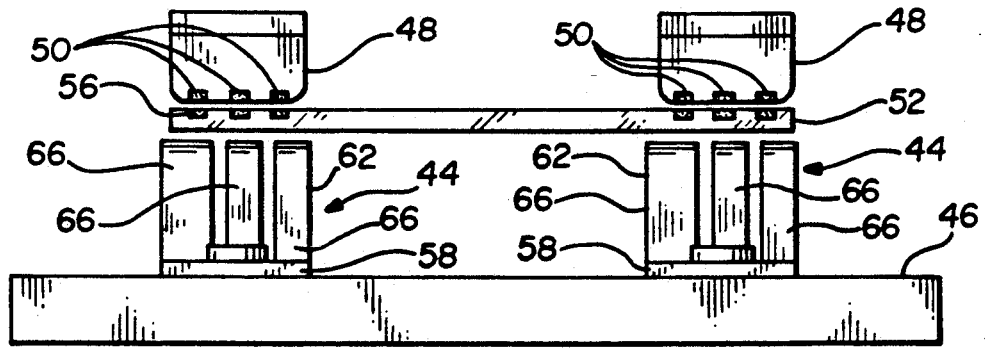
FIG. 6 is an end view of the magnetic reading and/or recording apparatus shown in FIG. 4.

A third embodiment of the magnetic reading and/or recording apparatus, generally designated by numeral 42, is shown in FIGS. 4, 5 and 6. The magnetic reading and/or recording apparatus 42 comprises a backing plate 44. The backing plate 44 is fixed to a mounting plate 46 and is aligned with a housing 48 having a plurality of magnetic reading and/or recording elements 50 attached thereto. A photographic material 52 having a magnetic surface 54 which has the capability to have information recorded in distinct tracks 56 is transported between the backing plate 44 and the magnetic reading and/or recording elements 50. The transport and drive means of the photographic material 52 may take various forms well known to those skilled in the art.

Referring now to the specific construction of the backing plate 44, the backing plate 44 comprises a thin flexible, metal or plastic, structure comprising base flanges 58 which are attached to the mounting plate by screws or rivets 60. The backing plate 44 further includes a pair of upstanding legs 62 bridged by an integral photographic material supporting plate segment 64.

As shown most clearly in FIGS. 5 and 6, the backing plate portions 62 and 64 are cut out to define separate photographic material supporting segments 66 which independently support the photographic material 52 below its information tracks 56. The photographic material supporting segments 66 can be independently sized to control their respective spring forces.

In its relaxed state, the photographic material supporting plate segment 64 is flat. However, in operation the backing plate 44 is depressed by the housing 48 as shown in FIG. 1. In this curved configuration, the ambient resiliency of the backing plate 44 causes the individual photographic material supporting segments 66 to urge the aligned information tracks 56 into substantial contact with the respective magnetic reading and/or recording elements 50. The individual photographic material supporting segments 66 independently bias their respective information tracks 56 and can be independently sized in the width dimension to provide desired biasing forces to compensate for irregularities in the photographic material.

This embodiment can include a second magnetic reading and/or recording apparatus 42 fixed to the mounting plate 46 in spaced relationship to the other magnetic reading and/or recording apparatus 42 along an opposite edge of the photographic material.

The present invention has been described in detail with particular reference to a preferred embodiment thereof, but it will be understood that variations and modifications can be effected within the spirit and scope of the invention.

We claim:

1. A magnetic reading and/or recording apparatus comprising:
   a plurality of magnetic reading and/or recording elements to read and/or record information from-/on a flexible magnetic recording material;
   a flexible plate having several cut-outs arranged to define individual flexible sections of said plate between respective pairs of said cut-outs; and
   means for arranging said magnetic reading and/or recording elements and said flexible plate to position said flexible sections of said plate to support respective flexible sections of a flexible magnetic recording material substantially in contact with said magnetic reading and/or recording elements.

2. A magnetic reading and/or recording apparatus as defined in claim 1, wherein said arranging means includes a mounting block having a recess to accept said flexible plate.

3. A photographic apparatus comprising:
   a plurality of magnetic reading and/or recording elements to read and/or record information from-/on a flexible photographic material; and
   a flexible plate having a plurality of individual flexible segments each positioned to independently bias respective flexible sections of a flexible photographic material substantially into contact with different ones of said magnetic reading and/or recording elements.

4. A photographic apparatus as defined in claim 3, further including a resilient pad located adjacent said flexible plate on a side of said plate opposite a side adjacent to a flexible photographic material, and means for applying discrete amounts of pressure along said resilient pad to insure a uniform interface between the photographic material and said magnetic reading and/or recording elements.

5. A photographic apparatus as defined in claim 3, further including means for automatically adjusting said flexible plate in a roll axis to insure a uniform interface between said magnetic reading and/or recording elements and a flexible photographic material.

6. A photographic apparatus as defined in claim 5 wherein said adjusting means includes a mounting block having a recess to accept said flexible plate and having opposite edges located on a lower portion of said mounting block, and a loading spring positioned across said opposite edges of said mounting block.

* * * * *